United States Patent
Marumo et al.

(10) Patent No.: US 7,338,682 B2
(45) Date of Patent: Mar. 4, 2008

(54) METHOD FOR PRODUCING A COAGULATE FOOD COMPRISING RAW MATERIAL OF KONNYAKU AND BEAN CURD GROUND PRODUCT AND SAID COAGULATE FOOD

(75) Inventors: Yoshitomo Marumo, Gardena, CA (US); Koji Bonkobara, Gardena, CA (US); Tadashi Ishino, Gardena, CA (US); Tomio Uehara, Garden Grove, CA (US)

(73) Assignees: Super Frec U.S.A. Inc., Gardena, CA (US); House Foods America Corporation, Garden Grove, CA (US)

( * ) Notice: Subject to any disclaimer, the term of this patent is extended or adjusted under 35 U.S.C. 154(b) by 72 days.

(21) Appl. No.: 10/866,718

(22) Filed: Jun. 15, 2004

(65) Prior Publication Data

US 2006/0003082 A1    Jan. 5, 2006

(51) Int. Cl.
*A23L 1/20* (2006.01)

(52) U.S. Cl. ...................... 426/634; 426/615

(58) Field of Classification Search ................ 426/557, 426/560, 578, 634, 637, 516, 615
See application file for complete search history.

(56) References Cited

U.S. PATENT DOCUMENTS

| 1,965,618 | A | * | 7/1934 | Vogt ........................... 426/417 |
| 4,676,976 | A | * | 6/1987 | Toba et al. ................. 424/485 |
| 5,186,970 | A | * | 2/1993 | Ogiwara et al. ............ 426/512 |
| 6,331,324 | B1 | * | 12/2001 | Tomita et al. .............. 426/634 |

FOREIGN PATENT DOCUMENTS

JP    356032967 A * 4/1981
JP    408098661 A * 4/1996

OTHER PUBLICATIONS

Merriam Webster's Dictionary online, 2002, www.dictionary.com, p. 1.*
Phillips, Handbook of Hydrocolloids, 2000, Woodhead Publising, p. 420 and Title Details.*

* cited by examiner

*Primary Examiner*—Keith Hendricks
*Assistant Examiner*—Jyoti Chawla
(74) *Attorney, Agent, or Firm*—Oblon, Spivak, McClelland, Maier & Neustadt, P.C.

(57) ABSTRACT

The invention provides a process for producing a coagulate food which comprises the following steps: (a) preparing KONNYAKU paste containing raw materials of KONNYAKU and water, in which a bean curd ground product, or this product and other raw materials, not more than 10% by mass of the product being 0.05 mm ON ("0.05 mm ON" means that the product cannot pass through 0.05 mm mesh) and not less than 50% by mass of the product being 0.075 mm PASS ("0.075 mm PASS" means that the product can pass through 0.075 mm mesh) when the product is sieved by meshes, is added to and mixed with the KONNYAKU paste 1 to 3 minutes after the raw materials of KONNYAKU is added to the water; (b) adding a coagulant to the KONNYAKU paste; and (c) forming and heat-treating the KONNYAKU paste. According to the production process of the invention, a coagulate food (TOFU SHIRATAKI) can be produced by the existing manufacturing machine for SHIRATAKI, which food has a uniformly soft and smooth texture compatible with the physical characteristics of KONNYAKU and TOFU and a taste similar thereto, does not crumble while boiling it and can be eaten even if the product is a raw one. In addition, a stringy coagulate food is provided, which food is chewable even if the food is boiled and can be eaten like ordinary noodles and pasta.

18 Claims, 1 Drawing Sheet

METHOD FOR PRODUCING A COAGULATE FOOD COMPRISING RAW MATERIAL OF KONNYAKU AND BEAN CURD GROUND PRODUCT AND SAID COAGULATE FOOD

BACKGROUND OF THE INVENTION

"SHIRATAKI (noodles made of devil's tongue)", which is also referred to as "ITOKONNYAKU", is a traditional Japanese food used in Japanese-style dishes such as ODEN (Japanese hotchpotch boiled in a kelp-based broth seasoned with soy sauce), SUKIYAKI (thin slices of beef cooked in a heavy iron pan with various vegetables and TOFU) and NIMONO (steamed food). SHIRATAKI is produced by adding an alkalinity coagulant such as calcium hydroxide to "KONNYAKU paste" which is prepared by dissolving grinded KONNYAKU potato and/or KONNYAKU powder in water, and subsequently boiling a stringy extrusion derived from said KONNYAKU paste to gelate it.

The SHIRATAKI is generally cooked together with other foods without seasoning and then eaten. It is inappropriate to eat SHIRATAKI like noodles without cooking it since uncooked SHIRATAKI have a texture like a rubber and no taste.

"TOFU (bean curd)" is a traditional Japanese food used in NIMONO and/or miso soup, and is produced by boiling soy milk, adding a coagulant to this boiling soy milk, and then coagulating it into a predetermined shape. TOFU has a soft and smooth texture, but TOFU is produced by charging it in a container or casing and it is thus difficult to produce TOFU in the form of elongated string-like noodles.

Japanese Laid-Open Patent Application 8-98661(1996) describes TOFU KONNYAKU characterized in that KONNYAKU (devil's tongue) and a bean curd ground product are mixed uniformly, the mixture is coagulated entirely by gel of KONNYAKU and the resulting TOFU KONNYAKU is porous due to air bubbles contained in it. The Japanese Patent Application also describes forming the TOFU KONNYAKU in a form such as that of SHIRATAKI, i.e. a stringy form.

Japanese Laid-Open Patent Application 8-98662(1996) describes a method for producing KONNYAKU characterized in adding water to KONNYAKU powder or grinded KONNYAKU potato and mixing it, preparing KONNYAKU paste by swelling the mixture, crumbling the KONNYAKU paste by a cutter, chopper or grater, subsequently adding and stirring an additional material(s) to this mixture, then adding a coagulant, followed by forming and heating. The Japanese Patent Application also describes forming the KONNYAKU in a stringy form.

This prior art provides foods having a taste and texture which are a combination of those of KONNYAKU and TOFU by coagulating the mixture of KONNYAKU paste and a bean curd ground product. That is, the foods are softer and tenderer than KONNYAKU and harder and tougher than TOFU, and have a porous texture in which air bubbles are contained in them and thus when these foods are boiled, gravy can penetrate within them to make them taste good.

In the method for producing TOFU KONNYAKU described in Japanese Laid-Open Patent Application 8-98662(1996), however, it is very difficult to uniformly mix the KONNYAKU paste with other material(s), because the KONNYAKU paste has high viscosity after preparing it. It is also necessary to crumble the KONNYAKU paste by a cutter, chopper or grater, after preparing and before mixing it with the bean curd ground product. Furthermore, in the production process which comprises treating the KONNYAKU paste, which is prepared by letting a mixture of water added to KONNYAKU powder or grinded KONNYAKU potato stand for not less than one hour to swell it, crumbling the KONNYAKU paste by a cutter, chopper or grater and then mixing it with an additional materials, it takes a long time to conduct the steps from mixing the materials to the end of production. In addition, this prior art has a problem in that the TOFU KONNYAKU breaks due to some air bubbles growing together because the TOFU KONNYAKU has a porous texture in which the air bubbles are produced when the bean curd ground product is mixed with the KONNYAKU paste and thus the TOFU KONNYAKU cannot be formed in the stringy form of a stably uniformed size.

SUMMARY OF THE INVENTION

The inventors have intensely studied the above problems of the prior art in order to produce a stringy coagulate food and the like, and as a result, have obtained the following knowledge. That is, in the process for producing a coagulate food, which comprises mixing and stirring KONNYAKU paste and a bean curd ground product, subsequently adding a coagulator to the mixture, and then forming and heat-treating the mixture, the quality and property of the obtained coagulate food depends strongly on (1) when the bean curd ground product is added to the KONNYAKU paste and (2) the shape of the bean curd ground product. The inventors have accomplished the present invention, which resolves the above problems, based on the above knowledge.

Therefore, the invention provides a process for producing a coagulate food which comprises the following steps:

(a) preparing KONNYAKU paste containing raw materials of KONNYAKU and water, in which a bean curd ground product, or this product and other raw materials, not more than 10% by mass of the product being 0.05 mm ON ("0.05 mm ON" means that the product cannot pass through 0.05 mm mesh) and not less than 50% by mass of the product being 0.075 mm PASS ("0.075 mm PASS" means that the product can pass through 0.075 mm mesh) when the product is sieved by meshes, is added to and mixed with the KONNYAKU paste 1 to 3 minutes after the raw materials of KONNYAKU is added to the water;

(b) adding a coagulant to the KONNYAKU paste; and (c) forming and heat-treating the KONNYAKU paste.

According to the production process of the invention, a coagulate food (block shaped food, TOFU SHIRATAKI and the like) is provided, which food has a uniformly soft and smooth texture compatible with the physical characteristics of KONNYAKU and TOFU and a taste similar thereto, does not crumble while boiling it and can be eaten even if the product is a raw one. In addition, a stringy coagulate food is provided, which food is chewable even if the food is boiled and can be eaten like ordinary noodles and pasta.

DESCRIPTION OF THE PREFERRED EMBODIMENT

Preparation of KONNYAKU Paste

Figure 1:
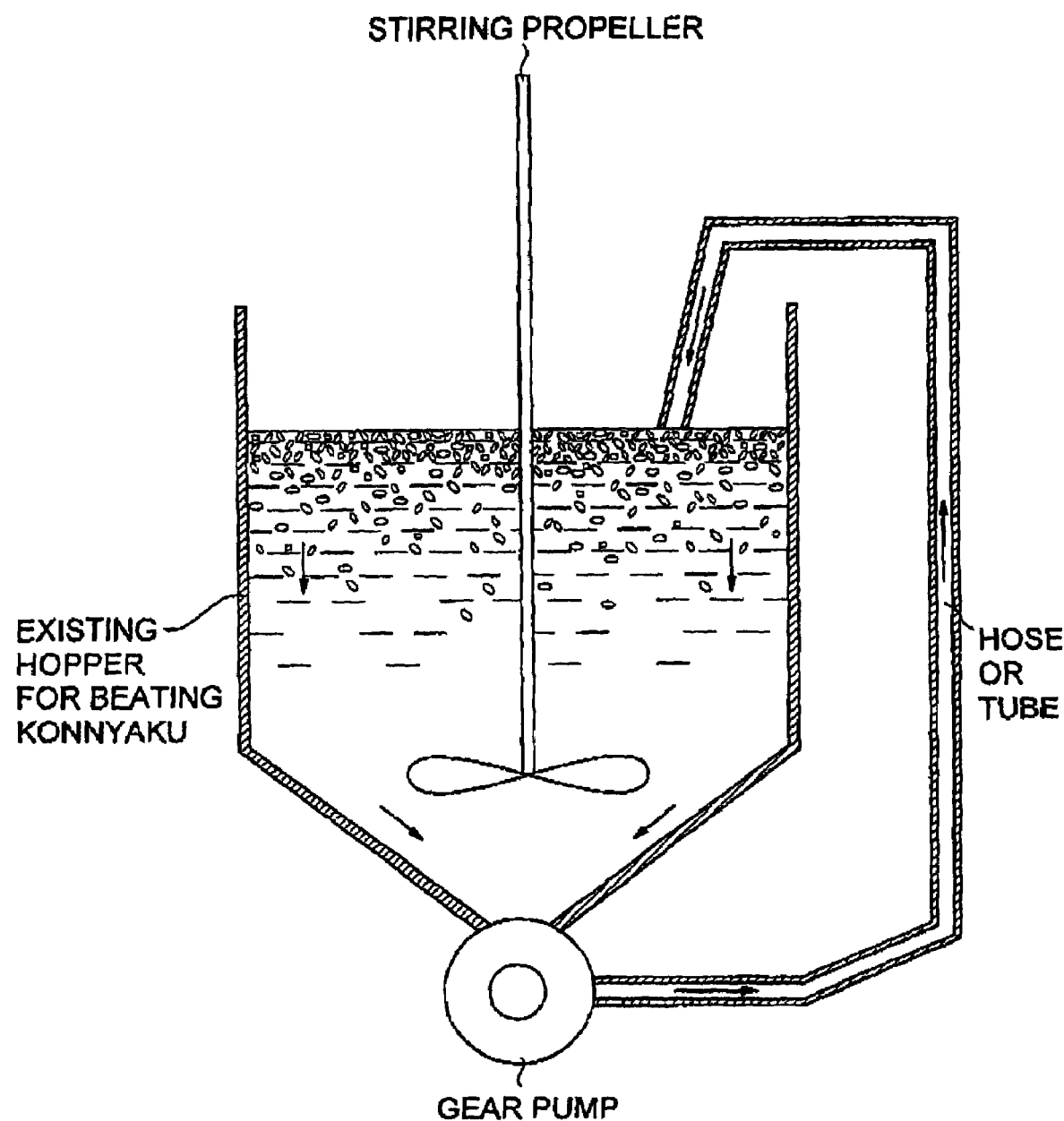
FIG. 1 shows a schematic view of an example of a mixing and stirring apparatus.

In the production process of the invention, KONNYAKU paste is prepared, for example, by adding raw materials of KONNYAKU to water while stirring them. In order to enable the raw materials of KONNYAKU to dissolve in the water so that they do not become lumpy, the raw materials of KONNYAKU are gradually added to the water for generally about one minute. The preparation of the KONNYAKU paste is preferably conducted for 7 to 13 minutes at 20 to 30° C. The above preparation comprises the step of adding and mixing the bean curd ground product described below to the KONNYAKU paste after all of the raw materials of KONNYAKU are added to the water. The raw materials of KONNYAKU include, for example grinded KONNYAKU potato, KONNYAKU powder and the like. In the production process of the invention, the solid content (the raw materials of KONNYAKU) derived from KONNYAKU is preferably 3 to 4% by mass, and more preferably 3.2 to 3.5% by mass, and the water content is preferably 96 to 97% by mass, and more preferably 96.5 to 96.8% by mass based on the total mass of the raw materials of KONNYAKU and the water. The total content of the raw materials of KONNYAKU and the water is preferably 20 to 90% by mass based on the mass of the KONNYAKU paste. When said content of the solid content derived from KONNYAKU and said total content of the raw materials of KONNYAKU and the water is within the range of 20 to 90% by mass, the viscosity of the finished KONNYAKU paste can be such that it can be gelated into various forms. Furthermore, the viscosity of the KONNYAKU paste is not too high when it is prepared, and thus it is easy to mix this paste with the bean curd ground product. The raw materials of KONNYAKU may be added to the water at room temperature.

Adding and Mixing the Bean Curd Ground Product and the like

The bean curd ground product is added to and mixed with the KONNYAKU paste while the KONNYAKU paste is being prepared by adding the raw materials of KONNYAKU to the water while stirring them.

As mentioned above, ① about 7 to 13 minutes are needed to prepare the KONNYAKU paste, and furthermore, ② about one minute is needed to add the raw materials of KONNYAKU to the water. Under such conditions, the bean curd ground product is preferably added to the KONNYAKU paste in accordance with the following timeline.

③ The addition of the bean curd ground product starts preferably 1 to 3 minutes after the addition of the raw materials of KONNYAKU has been accomplished, at which time the viscosity of the KONNYAKU paste increases to an appropriate level.

Furthermore, ④ the addition of the bean curd ground product ends preferably 6 to 10 minutes after the preparation of the KONNYAKU paste has started, because the preparation time of the KONNYAKU paste becomes long if a lot of the bean curd ground product is added and the timing of the start of the addition of the bean curd ground product is delayed.

Further, ⑤ the addition of the bean curd ground product is preferably accomplished in six minutes, and preferably four minutes, after the addition of the bean curd ground product starts. Generally about one minute is needed to add the bean curd ground product once, and it thus follows that the addition has to be accomplished within the above time.

The above timeline is shown as follows.

① ← .......... total preparation time, 7 to 13 mins. ............ →
② ← 1 min. →
③ ←1 to 3 mins. →←beginning of the addition of the bean curd ground product
④ ← .............. the end of the addition of the bean curd → ground product, 6 to 10 mins.
⑤ ← ←.... 6 mins. from the end of ③→
⑥ ← ←.. 4 mins. from the end of ③→

Adding the bean curd ground product according to the above timeline allows the KONNYAKU paste to keep adequate viscosity and to be mixed uniformly with the bean curd ground product. Furthermore, it allows the KONNYAKU powder to swell adequately and the KONNYAKU paste to keep a desired viscosity. In addition, when coagulating the KONNYAKU paste by heating in the following steps, it is possible to provide a coagulate food in string and flat bar forms, which food has a uniformly soft and smooth texture, does not crumble while boiling it and can be eaten even if the product is a raw one.

Particularly, when the bean curd ground product is added between ③ 1 to 3 minutes after the addition of the raw materials of KONNYAKU is accomplished and ⑤ 6 minutes, preferably ⑥ 4 minutes from the end of ③, the total preparation time of the KONNYAKU paste is reduced, for example to about ten minutes, physical load on the raw materials such as that caused by stirring is reduced, a rise in the temperature of the material is avoided, and a high quality KONNYAKU paste can be efficiently prepared.

The viscosity of the KONNYAKU paste is preferably 1,500 to 6,000 cp, and more preferably 2,000 to 5,000, at 24° C. while the bean curd ground product is being added to the KONNYAKU paste. When the viscosity is within the above range, it is possible to prepare the KONNYAKU paste very uniformly and smoothly mix the bean curd ground product into the KONNYAKU paste.

In this connection, the bean curd ground product is a coagulation of soymilk and the like, preferably ground by a mixer, grater or the like such that particles of the bean curd ground product are indistinctive. "The bean curd ground product" as used herein encompasses soymilk and a mixture of a coagulant for use in TOFU added to soymilk in the same amount as that used when TOFU is prepared. If the mixture of a coagulant for use in TOFU added to soymilk is used as the bean curd ground product, it is possible to obtain a uniform product because a TOFU component and raw materials of KONNYAKU cohere well while the mixture is being formed and coagulated by heating in the subsequent steps. The bean curd ground product is prepared such that 10 to 12% by mass of the product are preferably a solid derived from soy protein and 88 to 90% by mass of the product are water. Further, the viscosity of the bean curd ground product is preferably 500 to 1,200 cp, and more preferably 800 to 1,000, at 4° C. If the bean curd ground product has the above composition and viscosity, it is possible to uniformly and smoothly mix it into the KONNYAKU paste. Further, a size distribution of the particles of the bean curd ground product is such that preferably not more than 10% by mass of the particles are large ones which cannot pass through 0.5 mm mesh (0.5 mm ON) and not less than 50% by mass of the particles are small ones which can pass through 0.075 mm mesh (0.075 mm PASS) after grounding. If the size distribution of the bean curd ground product is outside the above range, the uniformity of the coagulate food tends to be bad because grains of the bean curd ground product of a size visible to the naked eye remain in the coagulate food. On the other hand, if the size distribution is within the above range, it is possible to produce the coagulate food having a smooth texture because the bean curd ground product is quite mixed and combined with KONNYAKU components.

An amount of the bean curd ground product added to the KONNYAKU paste is preferably 10 to 80% by mass, and more preferably 20 to 60% by mass, based on the total mass of the KONNYAKU paste. If the amount of the bean curd ground product is within the above range, it is possible to have a viscosity sufficient to obtain a coagulate food in the string or flat bar forms and thus to achieve a soft and tender texture, such a texture being the feature of the present invention.

Further, other materials may be added together with the bean curd ground product, such as spinach, carrots, pumpkin, vegetable-paste produced by grating lotus root, fruit-paste, starch, buckwheat flour, rice powder, grated bean curd refuse, as well as chili pepper, peppermint, vanilla, various type of other seasonings, spices, flavoring ingredients and the like. The total amount of the above other materials added to the KONNYAKU paste is preferably 5 to 10% by mass, and more preferably 5 to 7% by mass, based on the total mass of the KONNYAKU paste. If the total amount of the other materials is within the above range, it is possible to provide the coagulate food with the properties of the other materials without reducing the desired quality of the coagulate food.

In the step for mixing the KONNYAKU paste and the bean curd ground product and optionally the other materials, it is preferable to mix and stir them such that air bubbles are not contained in the mixture. Mixing and stirring are preferably conducted using a mulling machine equipped with a pump therein, the pump sucking materials and expelling the sucked materials into the remaining KONNYAKU paste concurrently with the suction of the materials. An example of the mulling machine includes a device equipped with a gear pump, plunger pump, screw extruder or the like at the bottom of a mixing bath and the like. Especially preferable is the gear pump. It is preferable that the discharge nozzle size be 1.5 to 2 inches, its discharge pressure be 0.20 to 0.50 kpa and its capacity be 3,000 to 4,500 l/hour. When the discharge nozzle size, the discharge pressure and the capacity is within the above range, it is possible to prepare a smooth creamy KONNYAKU paste because the viscous KONNYAKU paste containing no air bubbles can be uniformly mixed with the bean curd ground product and the like. A schematic view of an example of the mulling machine is shown in FIG. 1. In this connection, it is possible to use a mulling machine other than the above type, which can prevent the air bubbles being entrained or deaerated from the KONNYAKU paste. For example, a vacuum deaerate type mulling machine may be used.

In the present invention, the above mulling of the KONNYAKU paste is preferably conducted at 20 to 30° C., and more preferably 23 to 27° C. It is possible to prepare a viscous KONNYAKU paste sufficiently uniformly mixed with the other materials and the bean curd ground product.

The viscosity of the KONNYAKU paste obtained as mentioned above is preferably 3,500 to 8,500 cp, and more preferably 5,000 to 7,000, at 20 to 30° C. When the KONNYAKU paste having the viscosity within the above range is heat-coagulated in the subsequent steps, it is possible to provide a food which has a uniformly soft and smooth texture, does not crumble while boiling it, can be eaten even if the product is a raw one and is a suitably stringy coagulate food. The design of the mulling machine and the length of the mulling time can be appropriately changed such that the above viscosity of the KONNYAKU paste is obtained.

Aging of KONNYAKU Paste

In the invention, after mulling, the KONNYAKU paste is preferably aged for not less than 60 minutes at 20 to 30° C., and more preferably 60 to 90 minutes at 23 to 27° C., and subsequently a coagulant is added to the KONNYAKU paste. The swelling of the KONNYAKU paste further progresses due to the above aging and the viscosity of the KONNYAKU paste increases appropriately. The viscosity of the mixture after aging is preferably 9,000 to 14,000 cp, and more preferably 10,000 to 13,000 cp, at 20 to 30° C.

Holding the KONNYAKU paste for a desired period is sufficient for aging the KONNYAKU paste, that is, the KONNYAKU paste is never mulled and left to stand. It is possible to provide a coagulate food having a desired quality because the KONNYAKU paste is made more uniform by conducting the above aging treatment.

A coagulant, which is referred to as lime water and which is generally an aqueous solution of calcium hydroxide, calcium carbonate, sodium hydroxide, sodium carbonate, eggshell calcium and the like, is used. For the purpose of reducing lime odor from the coagulant, it is desirable to use an aqueous solution of shell-lime purified from eggshell calcium. The coagulant is preferably added to the mixture such that the pH of the mixture is within the range of 10.5 to 11.4 (i.e. about 11.00). When the pH of the mixture is within the above range, the smoothness of TOFU KONNYAKU is never impaired and TOFU KONNYAKU is never broken while it is being produced in the form of a string.

Forming and Heat Coagulating of the KONNYAKU Paste

In the invention, after the addition of the above coagulant, the KONNYAKU paste is formed and heat-treated.

Forming of the KONNYAKU paste can be conducted in accordance with any suitable conventional means, for example, when the coagulate food is produced in the form of a string, the mixture, to which the coagulant is added, can be continuously extruded from an opening, slit and the like of a catch basin and the like and then boiled in hot water. Further, when forming the block shaped food, the KONNYAKU paste can be filled in a mold and casing, and then formed like KONNYAKU. The coagulate food can be formed in the flat bar form like Japanese "KISHIMEN".

The KONNYAKU paste is preferably heat coagulated at 78 to 83° C. for 4 to 4.5 minutes in the case of the stringy coagulate food and for 15 to 20 minutes in the case of the block shaped coagulate food.

Properties of Coagulate Food of the Invention

The method for producing the coagulate food of the invention is as mentioned above, and according to the method, a food can be provided which has the following properties; namely, a uniformly soft and smooth texture, does not crumble while boiling it, can be eaten even if the product is a raw one, and is a suitably stringy coagulate food.

In this connection, it is desirable for the purpose of obtaining the above properties that the coagulate food of the invention have about 3.0 to about 3.1 kg of "hardness" and 0.4 to 0.5 kg of "breaking strength". Wherein the "hardness" and the "breaking strength" are measured as follows, respectively.

"Hardness": a bag is filled with the mixture, to which the coagulant is added, in the same way as ordinary block shaped KONNYAKU and the mixture is coagulated, and then the coagulation is extruded using a press having a hole of φ 45 mm, and the extruded coagulation is used as a measuring samples, which coagulation is uniformly 30 mm thick. The above sample is placed on a non-slip platform, a card-measuring adapter (20 mm in diameter)

with a rheometer (NRM-2010J-CW from Fudo Kogyo) is loaded on the platform and then the "hardness" is measured at 60 mm/min of a table climbing speed.

"Breaking strength": The above sample is placed on a non-slip platform, denture mold pushrod B adapter (20 mm in tooth width) with a rheometer (NRM-2010J-CW from Fudo Kogyo) is loaded on the platform and then the "hardness" is measured at 60 mm/min of a table climbing speed.

In addition, the stringy coagulate food is of a high quality, having a thickness of about 1.8 to 3.3 mm measured by a micrometer caliper and an average thickness of about 2.5 mm.

In the invention, "hardness", "breaking strength" and "thickness in the stringy form" shall be defined as mentioned above.

EXAMPLE

Example 1

Soymilk, a concentration of which is 11.5% by mass in water, was coagulated by a coagulant mixture of SUMASHIKO (calcium sulfate) and GDL (gluconodeltalactone) in a 4-gallon container and the resulting TOFU was grinded by a homogenizer (High Shear Mixer) until it was creamy (about 3.5 minutes) to obtain 135 kg of a bean curd ground product. About 10 to 11% by mass of the ground product is comprised of a solid from soy protein and about 89 to 90% by mass of the ground product is comprised of water. The ground product had a viscosity of about 800 cp. In addition, about 3 to 4% by mass of the ground product is comprised of "0.5 mm ON" and about 52 to 53% by mass of the ground product is comprised of "0.075 mm PASS".

Using the mulling machine, which was equipped with a gear pump at the bottom of a hopper type mixing tank having about a 1000 litter capacity, the pump sucking materials and expelling the sucked materials into the remaining KONNYAKU paste concurrently with the suction of the materials (see FIG. 1), 3700 g of water was put in the mixing tank and then about 1200 g of KONNYAKU paste was put in the mixing tank over one minute, and these were stirred to prepare the KONNYAKU paste. The preparation of the KONNYAKU paste, including the subsequent steps, was conducted at 24° C. About 3 to 4% by mass of the KONNYAKU paste is comprised of a solid from KONNYAKU and about 96 to 97% by mass of the KONNYAKU paste is comprised of water.

Said bean curd ground product (refrigelated at 4° C.) was added to the mixing tank 2.5 minutes after the start of the preparation of the KONNYAKU paste (at this moment in time, the viscosity of the KONNYAKU paste was about 2,500 cp at 24° C.), and then these materials were mulled to prevent air bubbles from being mixed into these materials to obtain the KONNYAKU paste. In this case, mulling of these materials was conducted by a driving gear pump having a discharge nozzle size of 2 inches at a discharge pressure of about 0.35 Kpa and a delivery of about 4000 l/hours.

The mulling of the KONNYAKU paste was continued for 2 to 12 hours from the start of the preparation of the KONNYAKU paste, and then the mulling was stopped at the time that a viscosity of the KONNYAKU paste became about 5,500 cp at 21° C. The materials were then uniformly well mixed. After the mulling was stopped, the KONNYAKU paste was aged for 60 minutes while maintaining it in a mixing tank. The viscosity of the aged KONNYAKU paste was about 11,500 cp at 22° C.

An aqueous solution of calcium hydroxide was added to and mixed with the aged KKONNYAKU paste until its pH became 11. A further coagulant was then added to the mixture and then the mixture was extruded continuously from a perforated plate, and next the extrusion was boiled in hot water at 83° C. for 4 minutes to obtain a stringy coagulate food (TOFU SHIRATAKI).

The resulting coagulate food was that having the stringy (noodle) form having an average thickness of 2.5 mm, a "hardness" of about 3 kg and a "breaking strength" of about 0.4 to 0.5 kg. This coagulate food has a uniformly soft and smooth texture, does not crumble while boiling it and can be eaten even if the product is a raw one.

Examples 2 to 4 and Comparative Examples 1 and 2

In place of the bean curd ground product used in Example 1, the bean curd ground product or soymilk listed in Table 1 was used to obtain TOFU SHIRATAKI in the same way as in Example 1. Properties of the resulting TOFU SHIRATAKI were estimated based on the following criteria.

◎=KONNYAKU component and bean curd ground product are mixed together completely homogeneously and the mixture has a smooth texture.

○=KONNYAKU component and bean curd ground product are mixed moderately homogeneously and the mixture has a smooth texture.

△=There are some small clumps of bean curd ground product in KONNYAKU component and the mixture has a less smooth texture.

x=There are some large clumps of bean curd ground product in KONNYAKU component and the mixture has a bad texture.

TABLE 1

|  | Example 1 Gallons TOFU | Example 2 11.5% soymilk | Example 3 SUKUI TOFU | Example 4 Special silken TOFU | Example 5 11.5% soymilk containing coagulant | Comparative example 1 Silken TOFU | Comparative example 2 Cottony TOFU |
|---|---|---|---|---|---|---|---|
| 0.5 mm ON | 3~4% | 0% | 5~6% | 9~10% | 0% | 44~45% | 48~49% |
| 0.075 mm PASS | 52~53% | 100% | 69~70% | 61~62% | 100% | 31~32% | 24~25% |
| Total | 100% | 100% | 100% | 100% | 100% | 100% | 100% |
| Water content | 89~90% | 89~90% | 89~90% | 87~88% | 89~90% | 87~88% | 85~86% |
| Solid matter content per 100 g | 10~11 g | 10~11 g | 10~11 g | 12~13 g | 10~11 g | 12~13 g | 14~15 g |
| Product compatibility | ◎ | ◎ | ◎ | ○ | ◎ | △ | X |

Each bean curd ground product used is as follows.

11.5% soymilk (Example 2): According to a general method for producing soymilk, soy beans were immersed in water and then ground while adding an adequate amount of water. Subsequently, the mixture obtained was heated up to about 103° C. while exposing it to steam and then it was cooled down to about 10° C. An amount of the ground soybeans and the added water was controlled to obtain a BRIX concentration of 11.5% by mass.

SUKUI bean curd ground product (Example 3): A brine aqueous solution and GDL were added to soymilk to obtain a soymilk concentration of 11% by mass and then mixed by a static mixer. Subsequently, a TOFU container was filled with the mixture and then sealed, and then the mixture was sterilized by heating (coagulation) and cooled down. Subsequently, the obtained mixture was ground by a homogenizer until the mixture became creamy (about 3.5 minutes).

Special silken bean curd ground product (Example 4): A brine aqueous solution and GDL were added to soymilk to obtain a 13% by mass concentration and then mixed by a static mixer. Subsequently, a TOFU container was filled with the mixture and then sealed, and then the mixture was sterilized by heating (coagulation) and cooled down. Subsequently, the obtained mixture was ground by a homogenizer until the mixture became creamy (about 3.5 minutes).

Soymilk of a 11.5% concentration mixed with a coagulant for use in TOFU (Example 5): A coagulant mixture of SUMASHIKO (calcium sulfate) and GDL (gluconodeltalactone) was added to and mixed with soymilk of a 11.5% by mass concentration in the same composition as that in Example 1.

Silken bean curd ground product (Comparative example 1): SUMASHIKO and GDL were added to soymilk of a 14% by mass concentration and then a box was filled with the mixture and the mixture was coagulated to obtain TOFU. The obtained TOFU was ground by a homogenizer until the mixture became creamy (about 3.5 minutes).

Cottony bean curd ground product (Comparative example 2): SUMASHIKO was added to soymilk of a 11.5% by mass concentration and then the mixture was coagulated in a basket for coagulation. Subsequently, a box having a bed of deformation cotton cloths was filled with the obtained coagulation and then pressed by a pressing machine to recoagulate TOFU. The obtained TOFU was ground by a homogenizer until the mixture became creamy (about 3.5 minutes).

When "0.5 mm ON" of the silken TOFU and the cottony TOFU was not less than 10% by mass, the uniformity of the coagulate food tended to be bad because grains of the bean curd ground product of a size visible to the naked eye remained in the coagulate food. On the other hand, when "0.5 mm ON" of the silken TOFU and the cottony TOFU was not more than 10% by mass and "0.075 mm PASS" of them was not less than 50% by mass, a good coagulate food could be obtained because grains of the bean curd ground product of a size visible to the naked eye did not remain in the coagulate food.

In addition, the coagulate food obtained in Examples 2 to 4 has essentially a uniformly soft and smooth texture, does not crumble while boiling it and can be eaten even if the product is a raw one like the one obtained in Example 1.

What is claimed is:

1. A process for preparing a coagulate composition comprising konnyaku and a bean curd, comprising:
   (i) adding powdered konnyaku raw material to water by stirring thus forming a konnyaku-water paste containing 3-4% by mass konnyaku solids and having a viscosity ranging between 1,500 to 6,000 cp at 24° C.,
   (ii) uniformly mixing 10-80% by mass of a ground bean curd product with 20-90% by mass of said konnyaku-water paste from step (i), 1 to 3 minutes after the addition of the powdered konnyaku raw materials to water in step (i), thus forming a smooth and creamy konnyaku-bean curd mixture which contains no air bubbles, in which the konnyaku-water paste of step (i) is uniformly mixed with the bean curd ground product,
   (iii) adding an alkali coagulant to the uniformly mixed konnyaku-bean curd mixture resulting from step (ii) to bring the pH of said konnyaku-bean curd mixture within the range of 10.5 to 11.4, and
   (iv) heating the mixture resulting from step (iii) at a temperature in the range of 78 to 83° C. to form a smooth and creamy coagulated konnyaku-bean curd composition which contains no air bubbles, in which the konnyaku-water paste is uniformly mixed with the bean curd around product;
   wherein the size distribution of the ground bean curd product is that 10% or less by mass cannot pass through a 0.5 mm mesh (Sieve No. 35) and 50% or more by mass of the ground bean curd product can pass through a 0.075 mm mesh (Sieve No. 200).

2. The process of claim 1, further comprising adding at least one other raw material to the konnyaku-water paste in step (ii), wherein said raw material is selected from at least one of the group consisting of spinach, carrots, pumpkin, vegetable-paste produced by grating lotus root, fruit-paste, starch, buckwheat flour, rice powder, grated bean curd refuse (okara), chili pepper, peppermint, vanilla, a seasoning, a spice, a flavoring ingredient; and combinations thereof.

3. The process of claim 1, wherein said konnyaku-water paste is prepared by mixing ground konnyaku potato or konnyaku powder with water at 20 to 30° C.

4. The process of claim 1, wherein the viscosity at 24° C. of the konnyaku-water paste is 2,000-6,000 cp while the ground bean curd product and other optional raw materials are being added.

5. The process of claim 1, wherein said ground bean curd product is soy milk or a mixture of soy milk and a tofu-coagulant in an amount used to produce tofu.

6. The process of claim 1, wherein said bean curd product is soy milk coagulated by a mixture of calcium sulfate and gluconodeltalactone (GDL) which is ground by a homogenizer until creamy.

7. The process of claim 1, wherein said ground bean curd is 10-12% by mass solids derived from soy protein and 88-90% water.

8. The process of claim 1, wherein the viscosity at 4° C. of the ground bean curd product is 500-1,200 cp.

9. The process of claim 1, wherein the konnyaku and ground bean curd are added to water within a period of 7-13 minutes.

10. The process of claim 1, wherein
konnyaku is added to water to form a water-konnyaku paste, the ground bean curd product is added to a water-konnyaku paste 1-3 minutes after the addition of konnyaku to the water and the ground bean curd product addition ends after 6-10 minutes after the addition of konnyaku to the water.

11. The process of claim 1, wherein the amount of raw materials other than the ground bean curd product added to the konnyaku-water mixture is 5 to 10% by mass based on the total mass of the konnyaku-bean curd mixture.

12. The process of claim 1, wherein said coagulant is lime water.

13. The process of claim 1, wherein the konnyaku-bean curd product mixture is formed into a string, block, or flat bar after addition of the coagulant.

14. The process of claim 1, wherein said konnyaku-bean curd product has a hardness of about 3.0 to about 3.1 kg and a breaking strength of 0.4 to 0.5.

15. The process of claim 1, wherein the konnyaku-bean curd product mixture is formed into a stringy coagulate food having a thickness of about 1.8 to 3.3 mm and an average thickness of about 2.5 mm.

16. The process of claim 1, wherein the konnyaku-water mixture is mixed with the bean curd product by a mulling machine equipped with a pump.

17. The process of claim 1, wherein the konnyaku-soy mixture is aged for not less than 60 minutes prior to addition of the coagulant.

18. The process of claim 1, wherein said coagulated composition comprising konnyaku and bean curd contains no xanthane gum.

* * * * *